United States Patent
Kiuchi et al.

(10) Patent No.: US 9,463,824 B2
(45) Date of Patent: Oct. 11, 2016

(54) STEERING WHEEL

(71) Applicant: NIHON PLAST CO., LTD., Fujinomiya-shi, Shizuoka (JP)

(72) Inventors: Yohei Kiuchi, Fujinomiya (JP); Akito Urushibata, Fujinomiya (JP)

(73) Assignee: NIHON PLAST CO., LTD., Fujinomiya-shi (JP)

( * ) Notice: Subject to any disclaimer, the term of this patent is extended or adjusted under 35 U.S.C. 154(b) by 0 days.

(21) Appl. No.: 14/305,131

(22) Filed: Jun. 16, 2014

(65) Prior Publication Data

US 2014/0366681 A1 Dec. 18, 2014

(30) Foreign Application Priority Data

Jun. 17, 2013 (JP) ................................. 2013-126665

(51) Int. Cl.
| | | |
|---|---|---|
| *B62D 1/11* | (2006.01) | |
| *B62B 1/04* | (2006.01) | |
| *B62D 1/04* | (2006.01) | |
| *B60R 21/05* | (2006.01) | |

(52) U.S. Cl.
CPC ............. *B62D 1/046* (2013.01); *B60R 21/05* (2013.01); *B62D 1/11* (2013.01); *Y10T 74/20834* (2015.01)

(58) Field of Classification Search
CPC ............ B62D 1/04; B62D 1/08; B62D 1/11; B62D 1/046; Y10T 74/20834; B60R 21/05
USPC .................. 74/552; 280/728.2, 731, 750; 200/61.54; D12/175, 176
See application file for complete search history.

(56) References Cited

U.S. PATENT DOCUMENTS

| | | | | |
|---|---|---|---|---|
| 2,081,729 | A | * 5/1937 | Beck | B62D 1/08 74/552 |
| D202,422 | S | * 9/1965 | Geller | 74/552 |
| 4,011,772 | A | * 3/1977 | Muller | 74/552 |
| 6,073,514 | A | * 6/2000 | Isomura | B62D 1/11 280/777 |
| 6,079,736 | A | 6/2000 | Koide | |
| 6,941,836 | B2 | * 9/2005 | Umemura et al. | 74/552 |
| 8,127,446 | B2 | * 3/2012 | LaBoskey | B21D 53/26 29/428 |

(Continued)

FOREIGN PATENT DOCUMENTS

| | | |
|---|---|---|
| EP | 394710 A1 * | 10/1990 |
| GB | 2516724 A | 2/2015 |
| JP | 2004098713 A | 4/2004 |

OTHER PUBLICATIONS

The United Kingdom office action issued on Oct. 30, 2015 in the counterpart United Kingdom patent application.

(Continued)

*Primary Examiner* — Adam D Rogers
(74) *Attorney, Agent, or Firm* — Mots Law, PLLC (57) ABSTRACT

A first spoke connects a first point of a boss and a first joining point of a rim. A second spoke connects a second point of the boss different from the first point of the boss and a second joining point of the rim opposite to the first joining point of the rim to the boss. Each of the first and second spokes is in a plate shape. The first spoke has a circular first hole in a portion of the first spoke located at a middle in a longitudinal direction of the first spoke and at a center in a widthwise direction of the first spoke. The second spoke has a circular second hole in a portion of the second spoke located at a middle in a longitudinal direction of the second spoke and at a center in a widthwise direction of the second spoke.

2 Claims, 5 Drawing Sheets

(56) References Cited

U.S. PATENT DOCUMENTS

| | | |
|---|---|---|
| 8,491,003 B2 * | 7/2013 | James et al. .................. 280/731 |
| 2002/0100342 A1 * | 8/2002 | Drefahl et al. ................. 74/552 |
| 2004/0011156 A1 | 1/2004 | Morgan et al. |
| 2004/0104510 A1 * | 6/2004 | Ito ........................... B29C 45/14 264/259 |
| 2005/0217413 A1 * | 10/2005 | Specht .................... B62D 1/04 74/552 |
| 2013/0319170 A1 * | 12/2013 | Wiseley et al. ................. 74/552 |

OTHER PUBLICATIONS

The Chinese office action letter issued on Jan. 5, 2016 in the counterpart Chinese patent application.

* cited by examiner

STEERING WHEEL

CROSS REFERENCE TO RELATED APPLICATION

This application is based upon and claims the benefit of priority from the prior Japanese Patent Application No. 2013-126665, filed on Jun. 17, 2013, the entire contents of which are incorporated herein by reference.

BACKGROUND

1. TECHNICAL FIELD

The disclosure relates to a steering wheel for steering a vehicle.

2. RELATED ART

There are steering wheels employing a deformable metal core structure to ensure the safety of the driver in the event of a vehicular collision or the like. Japanese Patent Application Publication No. 2004-98713 proposes a steering wheel configured such that for example, the metal core of a rim forming the steering wheel's rotary periphery is deformed in the opposite direction from the driver in the event of a vehicular collision or the like so that the impact on the driver hit against the rim can be absorbed and relaxed.

The above steering wheel is a so-called three-spoke type steering wheel having three spokes. Of the three spokes, a pair of spokes joined to the rim in the right-left direction (corresponding to the ring portion in Japanese Patent Application Publication No. 2004-98713) each has a first predetermined deformation portion capable of torsional deformation and a second predetermined deformation portion capable of torsional deformation upon self-alignment. They are configured such that switch operation portions arranged on the spokes on the front side can easily follow displacement of the rim upon self-alignment.

SUMMARY

The above steering wheel has the pair of right and left spokes capable of torsional deformation so that the switch operation portions will not protrude from the plane of the ring portion which is deformed upon self-alignment. Each of the pair of right and left spokes taking torsional deformation into consideration has ribs formed on its surface on the opposite side from the driver. However, the ribs are not formed on a portion (8d in drawings of Japanese Patent Application Publication No. 2004-98713) in the vicinity of a horizontal plate portion which is different from the second predetermined deformation portion, because a bending deformation point is set there. By this configuration, stress can be concentrated at the portion on which the ribs are not formed, that is, bending deformation can occur at a base end portion of the spoke on the boss side.

As one type of steering wheel, there are two-spoke type steering wheels. Typically, they employ a configuration in many cases in which a pair of spokes extending to the right and left from a center pad part are joined to a rim at two positions which can be expressed as an intermediate position between the three o'clock and four o'clock positions on a clock and an intermediate position between the eight o'clock and nine o'clock positions on the clock.

Since the number of spokes is reduced, a region defined by the rim and the pair of spokes of the steering wheel can be formed as a larger opening. Through this larger opening, the driver can more easily see meters, switches and indicators arranged around a shell column part covering a steering shaft, and the like.

Besides such a technical significance, reducing the number of spokes can also impart an impression that greatly differs from that of the three-spoke type in terms of design. Thus, the two-spoke type can provide a design which the driver and passengers see most frequently inside the cabin. Moreover, the two-spoke type can make a difference to the steering wheel, which is a unique interior part to be gripped and operated all the time during travel, and is therefore utilized as means for differentiating the vehicle type or grade or for providing a design appeal to certain types of users.

Unlike the three-spoke type steering wheel described above, the two-spoke type does not include restraining and deforming means like the spoke joined to a lower end portion (six o'clock position on a clock) of the rim. For this reason, there is a large degree of deformation freedom for torsional deformation caused by an impact load applied to the lower end portion of the rim.

Further, in the case of the three-spoke type steering wheel described above, when an impact load is applied rearward (in the opposite direction from the driver) to one of the right and left spokes, the spoke to which the impact load is applied and the spoke joined to the six o'clock position on the clock (lower end portion) can be deformed about deformation points on their base end portions on the boss side in a direction in which the rim is retreated from the driver, while withstanding the deformation by the impact load. With this deformation of the two spokes, the impact load can be absorbed.

On the other hand, in the case of the two-spoke type steering wheel, bending deformation occurs at the spoke to which an impact load is applied. Here, bending deformation occurs less easily at the other spoke on the opposite side of the boss. For this reason, the other spoke cannot assist the absorption of the impact load via its bending deformation.

Moreover, if each spoke is easily bendable, it is impossible to realize adequate bending deformation and generation of adequate reaction force (counteracting force) at the spoke while the rim is deformed in the retreating direction at a desired deformation speed. For this reason, it is not easy to provide the spoke with desired displacement characteristics which it is required to have.

In the case of the two-spoke type steering wheel, when an impact load is applied to the vicinity of one of the joining points of the spokes and the rim, necessary bending deformation characteristics are required for the spoke to which the impact load is applied. In addition, characteristics that allow both generation of desired reaction force and deformation of the rim in the retreating direction must be ensured.

Thus, a configuration having adequate strength against both torsional deformation and bending deformation is required for the two-spoke type steering wheel.

An object of the present invention is to provide a steering wheel which includes a pair of spokes joining a boss and a rim and which, upon application of an impact load to the steering wheel, can absorb the impact load via deformation of the rim without increasing torsional deformation of the spokes in a case where the impact load is applied to the lower end side of the rim, and absorb the impact load by increasing bending deformation of one of the spokes in a case where the impact load is applied to the joining point of the rim and the one spoke.

A steering wheel in accordance with some embodiments includes: a boss joined to a steering shaft; a rim arranged at an outer circumferential position of the boss; a first spoke connecting a first point of the boss and a first joining point of the rim; and a second spoke connecting a second point of the boss different from the first point of the boss and a second joining point of the rim opposite to the first joining point of the rim to the boss. Each of the first and second spokes is in a plate shape. The first spoke has a circular first hole in a portion of the first spoke located at a middle in a longitudinal direction of the first spoke and at a center in a widthwise direction of the first spoke. The second spoke has a circular second hole in a portion of the second spoke located at a middle in a longitudinal direction of the second spoke and at a center in a widthwise direction of the second spoke.

According to the above configuration, in a case where an impact load is applied to the steering wheel and the rim undergoes bending deformation in the opposite direction from the driver, that is, bending deformation occurs at the lower end side of the rim, resulting in application of a load that twists the first and second spokes, the torsional deformation occurring at the first and second spokes is hardly influenced by the presence of the first and second holes formed in the first and second spokes.

Since the torsional deformation occurs at the first and second spokes having desired rigidity, the first and second spokes in which the first and second holes are formed can sufficiently absorb the impact load. As described above, the impact load can be absorbed by the deformation of the rim and the torsional deformation of the first and second spokes in which the first and second holes are formed. The first and second holes do not lower the rigidity against the torsional deformation of the first and second spokes.

Moreover, when a load that bends one of the first and second spoke is applied as an impact load, the one of the first and second spokes in which the first and second holes are formed can undergo great bending deformation by the influence of the first and second holes. This makes the absorption of the impact load easy. The first and second holes serve a function of increasing bending deformation at the first and second spokes.

As described above, according to the above configuration, when an impact load is applied to the steering wheel, the first and second spokes having the first and second holes formed in a desired shape are deformed such that the impact load can be sufficiently absorbed by torsional deformation or bending deformation that occurs at the first and second spokes. As a result, a necessary displacement stroke can be given to the rim to which the impact load is applied, and the impact load can be sufficiently absorbed at the first and second spokes. Moreover, the first and second spokes can be provided with desired deformation characteristics which they are required to have.

The first hole may be located in a vicinity of a portion of the first spoke at which bending occurs when a load that bends the first spoke is applied from the first joining point. The second hole may be located in a vicinity of a portion of the second spoke at which bending occurs when a load that bends the second spoke is applied from the second joining point.

According to the above configuration, the first and second holes can increase the amounts of bending deformation that occurs at the first and second spokes. Thus, the absorption of an impact load via deformation of the first and second spokes can be done efficiently.

A bending rigidity of a first portion of the first spoke having the first hole may be a bending rigidity which increases an amount of bending deformation at the first portion when a load that bends the first spoke is applied to the rim. A torsional rigidity of the first portion of the first spoke may be a torsional rigidity which does not increase an amount of torsional deformation at the first portion when a load that twists the first spoke is applied to the rim. A bending rigidity of a second portion of the second spoke having the second hole may be a bending rigidity which increases an amount of bending deformation at the second portion when a load that bends the second spoke is applied to the rim. A torsional rigidity of the second portion of the second spoke may be a torsional rigidity which does not increase an amount of torsional deformation at the second portion when a load that twists the second spoke is applied to the rim.

According to the above configuration, as for bending deformation at the first and second spokes, forming the first and second holes can increase the amounts of the bending deformation. Moreover, the increased bending deformation of the first and second spokes can absorban impact load applied to the rim.

In addition, as for torsional deformation at the first and second spokes, the amounts of the torsional deformation at the first and second portions where the first and second holes are formed are prevented from increasing. Moreover, the first and second spokes are formed in such a way as not to lower the rigidity against the torsional deformation. As described above, an impact load can be sufficiently absorbed at the first and second spokes in which the first and second holes are formed.

The first hole may be a first through hole penetrating the first spoke in a thickness direction of the first spoke. The second hole may be a second through hole penetrating the second spoke in a thickness direction of the second spoke.

According to the above configuration, the first and second through holes have such shapes that their hole diameters have preferable sizes for the shapes of the first and second spokes. Thus, the first and second through holes do not operate in such a way as to increase the amounts of torsional deformation for torsional force to be applied the first and second spokes, whereas the first and second through holes operate in such a way to increase the amounts of bending deformation of the first and second spokes when bending stress is applied to the first and second spokes.

Note that the first and second holes may be formed as non-through holes having thin plates closing the inside of the first and second holes. In the case where the first and second holes are formed as the non-through holes, the thin plates may be provided inside the first and second holes. When torsional force is applied to the first and second spokes, these thin plates act as resistance to the torsional force. Moreover, when bending stress is applied to the first and second spokes, the thin plates are prevented from acting as large resistance to this bending stress, by setting the thickness of the thin plates to a desired thickness.

A hole diameter of the first through hole in the longitudinal direction of the first spoke may be within a range of 0.5 to 1.5 times a hole diameter of the first through hole in the widthwise direction of the first spoke. A hole diameter of the second through hole in the longitudinal direction of the second spoke may be within a range of 0.5 to 1.5 times a hole diameter of the second through hole in the widthwise direction of the second spoke.

According to the above configuration, it is possible to prevent a situation where the first and second through holes increase torsion at the first and second spokes on the right and left sides when an impact load is applied to the lower end side of the rim. Specifically, the first and second spokes in which the first and second through holes are formed can undergo torsional deformation of the same degree as the torsional deformation at the first and second spokes in which the first and second through holes are not formed.

Moreover, when, for example, an impact load is applied to the vicinity of one of the joining points of the rim to which the first and second spokes are joined, stress that causes bending deformation of the corresponding first or second spoke is applied to the first or second spoke. Even in this case, since the first and second spokes have necessary rigidity, the first or second spoke can effectively undergo bending deformation with the help of the corresponding first or second through hole while a necessary stroke is given to the rim.

A cross-sectional shape of the first through hole and a cross-sectional shape of the second through hole may be circular respectively.

According to the above configuration, there will not be formed any portion in the first or second through hole where stress concentration may occur. Accordingly, the above-described function of the first and second through holes can be realized efficiently.

DETAILED DESCRIPTION

An embodiment of the present application will described below in detail with reference to the drawings. Besides the shape and arrangement to be described below as the configuration of a steering wheel of the present invention, any shapes and arrangements can be employed as long as these shapes and arrangements can solve the problem which the present invention aims to solve. Thus, the present invention is not limited to the embodiment to be described below but is changeable in various ways.

Note that in the following description, the top-bottom direction is defined such that the uppermost end side and lowermost end side of the steering wheel correspond respectively to the upper side and lower side in a top view of the steering wheel in a neutral state, i.e. a state in which the vehicle travels straight (the neutral position of the steering wheel). Moreover, the right-left direction is defined as a direction crossing this top-bottom direction. Furthermore, the front-rear direction is defined such that the driver side of the steering wheel is the front side and the opposite side of the steering wheel from the driver is the rear side.

Figure 1A:
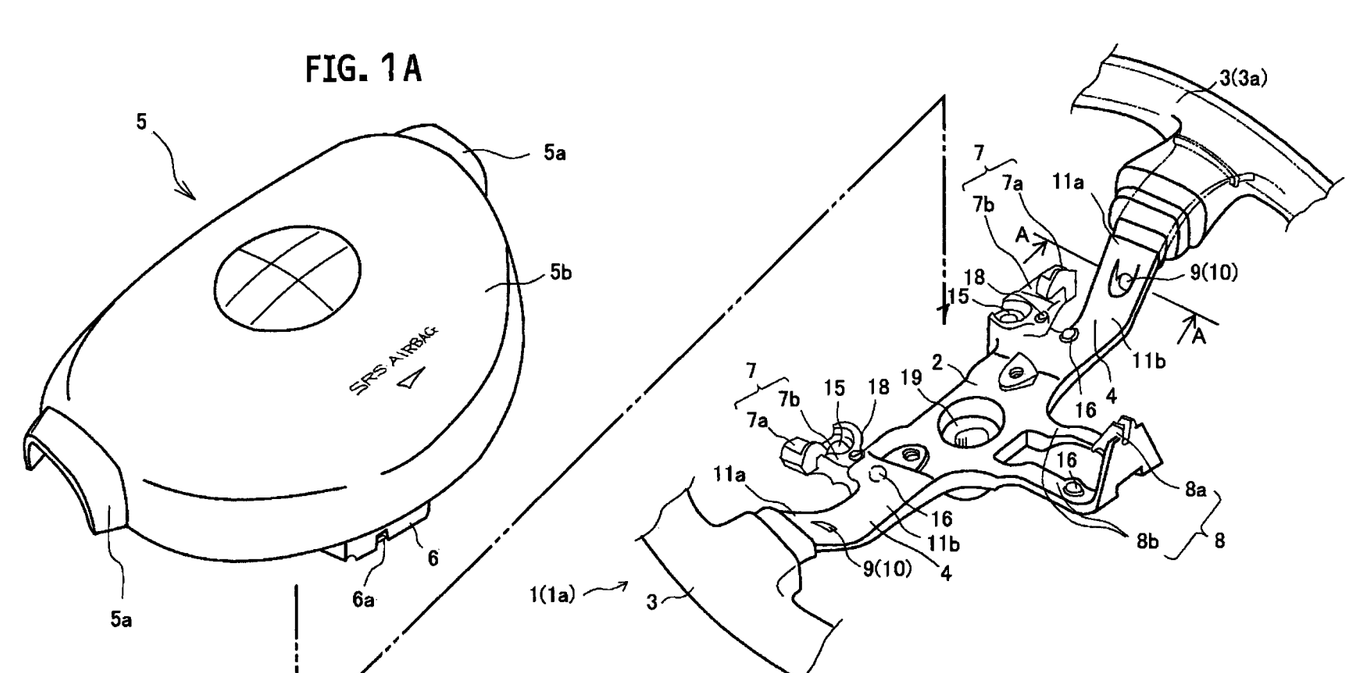
FIG. 1A is a perspective front view of the main part of a wheel body of a steering wheel according to an embodiment before an air bag module is mounted.
Figure 1B:
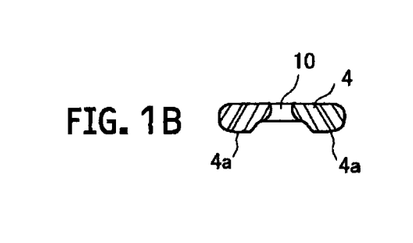
FIG. 1B is a cross-sectional view taken along line A-A in FIG. 1A with a hole formed as a through hole.
Figure 1C:
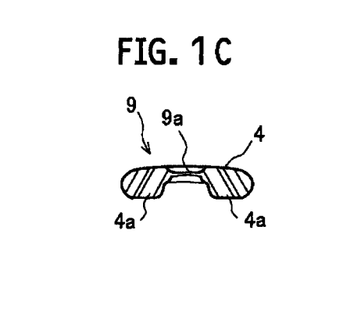
FIG. 1C is a cross-sectional view taken along line A-A in FIG. 1A with the hole formed as a non-through hole.

The configuration of a steering wheel 1 according to an embodiment of the present invention will be described with reference to FIGS. 1A to 1C. Note that the steering wheel 1 according to this embodiment includes spokes 4, 4 as a pair of spokes. FIG. 1A is a perspective front view showing the main part of a wheel body 1a of the steering wheel 1. FIG. 1B is a cross-sectional view taken along line A-A in FIG. 1A with a hole 9 formed as a through hole 10. FIG. 1C is a cross-sectional view taken along line A-A in FIG. 1A with the hole 9 formed as a non-through hole. In the case where the hole 9 is formed as a non-through hole, a thin plate 9a is formed in the hole 9 in such a way as to close the hole.

As shown in FIG. 1A, the steering wheel 1 includes the wheel body 1a and an air bag module 5 mounted on the wheel body 1a. The wheel body 1a includes: a boss 2 which has a shaft attachment hole 19 to be joined to a steering shaft 12 (see FIG. 2); a rim 3 which the driver grips; and the pair of right and left spokes 4, 4 connecting the boss 2 and a metal core 3a of the rim 3.

In FIG. 1A, in the neutral state of the steering wheel 1, the pair of spokes 4, 4 are arranged such that their longitudinal direction is substantially perpendicular to a line extending in the top-bottom direction and passing the center of the boss 2. However, the arrangement of the pair of spokes 4, 4 in the present invention is not limited to the configuration in FIG. 1A. The arrangement of the pair of spokes 4, 4 only needs to be such that the joining points of the spokes 4, 4 and the rim 3 are located on two portions of the rim 3 at the right and left sides of the boss 2 being at the center.

In other words, the present invention is applicable as long as the spokes 4, 4 in the neutral state of the steering wheel 1 are arranged such that their longitudinal direction crosses the line extending in the top-bottom direction passing the center of the boss 2. Moreover, even if the spokes 4, 4 are formed in a curved shape to be bent in a plan view, the present invention is still applicable as long as the spokes 4, 4 are arranged such that a line connecting the opposite ends of the spokes 4, 4 crosses the line extending in the top-bottom direction and passing the center of the boss 2.

Figure 2:
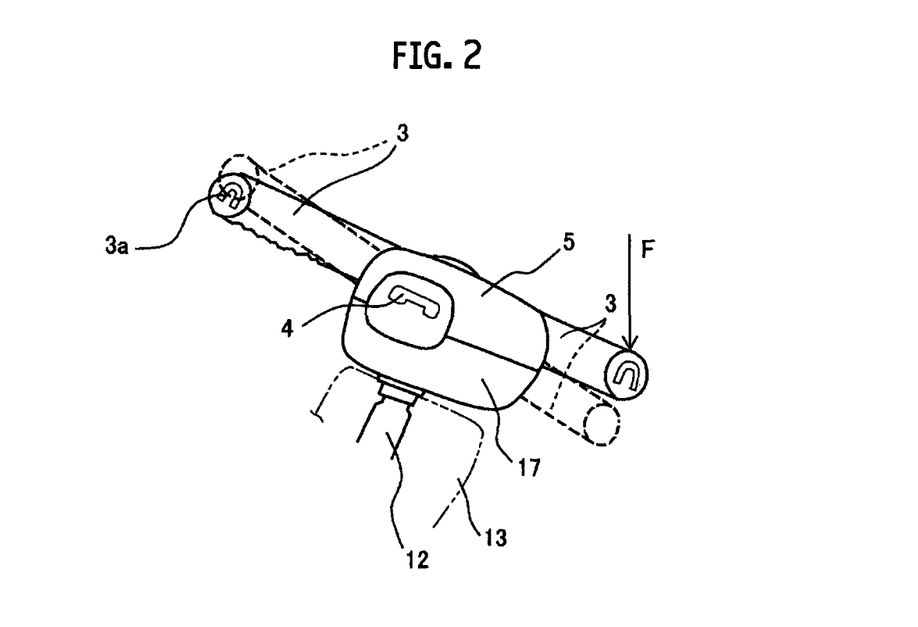
FIG. 2 is an explanatory view showing application of an impact load to a lower end portion of a rim of the steering wheel according to the embodiment.

As shown in FIG. 2, the periphery of the steering shaft 12 is covered with a column cover 13. Moreover, the air bag module 5 has such a conventionally known configuration that the inside thereof is covered with a cover member 5b and houses an air bag, an inflator, etc. not shown.

The air bag module 5 covers the driver side of the boss 2. The air bag module 5 covers the pair of right and left spokes 4, 4. A gap is formed between the outer peripheral edge of the air bag module 5 and the inner surface of the rim 3. With this gap, the air bag module 5 can be moved in the front-rear direction relative to the rim 3. Moreover, by moving the air bag module 5, which also functions as a horn switch, in the front-rear direction, the ON-OFF operation of the horn switch can be performed.

Note that although sleeve portions 5a, 5a are provided in FIG. 1A at two opposite shoulder portions of the cover member 5b for covering the spaces between the shoulder portions and the rim 3, the present invention is not limited to this configuration. For example, the sleeve portions 5a, 5a may not be provided to the air bag module 5 but formed as finishers and these pair of finishers may be provided to the wheel body 1a. In this case, a desired gap is formed between the inner side surface of each finisher and the outer peripheral edge of the air bag module 5 so that the air bag module 5 can be moved relative to the finisher through this gap. The sleeve portions 5a, 5a and the finishers can have desired designs and also include switches and the like if necessary.

The shaft attachment hole 19 for mounting the steering shaft 12 (see FIG. 2) is formed in the boss 2. Internal splines are formed on the inner peripheral surface of the shaft attachment hole 19. External splines are formed on the outer peripheral surface of the steering shaft 12. The shaft attachment hole 19 and the steering shaft 12 are joined by splining the shaft attachment hole 19 and the steering shaft 12 to each other at their internal and external splines.

An under cover 17 (see FIG. 2) configured to cover the back side of the wheel body 1a is provided at the inner side of the steering wheel 1. A support 16 for positioning and supporting an end portion of a spring not shown is provided at three positions on the wheel body 1a. The air bag module 5 is elastically supported by the biasing force of the spring not shown. Stationary contacts 18, 18 are provided in the vicinity of the supports 16. Each stationary contact 18 forms a horn switch mechanism in cooperation with a movable contact not shown provided to the air bag module 5. Note that a stationary contact 18 is formed also in the vicinity of the support 16 on the lower side of the wheel body 1a, but illustration of the stationary contact provided at this position is omitted.

In the wheel body 1a, there are formed pin engagement holes 15 for inserting positioning pins not shown formed on the back side of the air bag module 5, and hooks 7, 7, 8 configured to lock the air bag module 5 to the wheel body 1a while allowing slight movement of the air bag module 5 in a direction away from the wheel body 1a. The two hooks 7, 7 are provided away respectively from the two spokes 4, 4 provided along the right-left direction, and the hook 8 are provided on the lower side.

The hooks 7, 7, 8 are provided independently of the pair of right and left spokes 4, 4 and supported directly on the boss 2. Although the hooks 7, 7, 8 are provided at three positions on the boss 2 in FIG. 1A, the present invention is not limited to this configuration. For example, hooks may be provided at two positions as long as that arrangement allows the air bag module 5 to be attached in a well-balanced manner.

The pair of right and left hooks 7, 7 include leg portions 7b, 7b supported on the boss 2, and hook claws 7a, 7a formed at the top of the leg portions 7b, 7b. The hook 8 has a pair of leg portions 8b, 8b supported on the boss 2 at their base ends. Tip portions of the leg portions 8b, 8b are joined to each other, and a hook claw 8a is formed at the joined portion. The tips of the hook claws 7a, 7a, 8a are arranged to face the inner side of the wheel body 1a, and an inclined surface is formed at the upper surface of each of the hook claws 7a, 7a, 8a.

Note that in the above explanation, the configuration in which the hooks 7, 7, 8 are provided at three positions on the boss 2, and the configuration in which the springs and the stationary contacts 18 are provided at three positions are described. However, the present invention is not limited to these configurations. Their arranged positions may be any suitable two or more arranged positions as long as that configuration allows the air bag module 5 to be attached in a well-balanced manner.

The metal core 3a of the rim 3 (see FIG. 2), the boss 2, the spokes 4, and the hooks 6 to 8 of the wheel body 1a can be formed by integral molding using an aluminum alloy, a magnesium alloy, or the like. A front cover of the air bag module 5 (air bag module cover) is molded by injection molding or the like using a soft resin such as an olefinic thermoplastic elastomer resin. The air bag module 5, the under cover 17, and the like can be molded by injection molding or the like using a relatively hard resin such as polypropylene.

Snap attachment portions 6 which form one-touch snap fit mechanisms in cooperation with the hooks 7, 7, 8 are provided on the back side of the air bag module 5 at positions coinciding with the hooks 7, 7, 8. In FIG. 1A, part of the snap attachment portion 6 configured to engage with the hook 8 is illustrated.

Each snap attachment portion 6 is provided with an elastic line member 6a curved in a U-shape. Part of the elastic line member 6a is exposed to the outside from a space formed in the snap attachment portion 6. This exposed portion of the elastic line member 6a is configured to slide on the inclined surface of the corresponding hook claw 7a, 7a, 8a formed on the wheel body 1a side and engage with the corresponding hook claw 7a, 7a, 8a. Each of the two right and left spokes 4, 4 has a bending portion 11a formed in a curved shape at the rim 3 side and also has a bending portion 11b formed in a curved shape at the boss 2 side. By providing the bending portions 11a, 11b at least at two positions along the longitudinal direction of the spokes 4, 4, the boss 2 and the rim 3 can be joined to each other with the level difference therebetween smoothly reduced.

The hole 9 is formed on the bending portion 11a side of each spoke 4. The hole 9 can be formed as a through hole 10 as shown in FIG. 1B or as a non-through hole with a thin plate 911 provided at some depth inside the hole 9 as shown in FIG. 1C. Each of the spokes 4, 4 has lower bending strength at its two bending portions 11a, 11b than the bending strength at the portion between the bending portions 11a, 11b so as to allow easier bending deformation when a load is applied in a bending direction.

Note that although the hole 9 is formed on the bending portion 11a side in FIG. 1A, the hole 9 may be formed on the bending portion 11b side instead. In other words, the hole 9 only needs to be formed in the vicinity of the bending portion 11a or the bending portion 11b of each of the spokes 4, 4. By being formed at such a position, the hole 9 can facilitate bending deformation of its spoke 4 when bending stress is applied to the spoke 4.

In FIGS. 1A to 1C, reinforcing ribs 4a are formed at both side edges of each spoke 4 on the back side to enhance the bending strength of the portion between the two bending portions 11a, 11b. By forming the reinforcing ribs 4a, the bending rigidity and torsional rigidity of the spoke 4 can be enhanced. However, the reinforcing ribs 4a make it difficult for the spoke 4 to be easily curved in a desired state when an impact load is applied to the vicinity of the joining point of the spoke 4 and the rim 3.

To solve this, in this embodiment, the hole 9 (the through hole 10 is included as the hole 9) is formed between the two bending portions 11a, 11b in the vicinity of the bending portion 11a to make the spoke 4 easily bendable. Here, even if the hole 9 is provided, its spoke 4 might be easily twisted when an impact load is applied to a lower end portion of the rim 3, depending upon the shape of the hole 9, for example, in a case where the hole 9 is formed as an elongated opening as disclosed in Japanese Patent Application Publication No. 2004-98713. In fact, in the case of Japanese Patent Application Publication No. 2004-98713, each spoke is easily twistable because of the opening.

In contrast, in this embodiment, the hole 9 is formed in such a shape that the twist of the spoke 4 by torsional force applied to the spoke 4 is not increased. With this configuration, the hole 9 can provide the spoke 4 with desired torsional strength against application of an impact load to the lower end portion of the rim 3. On the other hand, the hole 9 can facilitate the bending deformation of the spoke 4 upon application of an impact load to the vicinity of the joining point of the rim 3 and the spoke 4 so that this impact load can be absorbed.

In the case where the hole 9 is the through hole 10, the through hole 10 can be formed in such a shape in cross section that the hole diameter in the longitudinal direction of the spoke 4 is a hole diameter within a range of 0.5 to 1.5 times the hole diameter in the widthwise direction of the spoke 4. In this way, the hole 9 (through hole 10) can increase the amount of bending deformation that occurs at its spoke 4, thereby allowing efficient absorption of an impact load via the deformation of the spoke 4.

In other words, when the widthwise dimension of the through hole 10 in the widthwise direction of the spokes 4, 4 is set to a given dimension, the dimension of the through hole 10 in the longitudinal direction of the spokes 4, 4 can be set to a dimension ranging from at least a half of the widthwise dimension to 1.5 times thereof. Thus, the through hole 10 can be formed in a shape ranging from an elliptical shape longer in the widthwise direction to a circular shape to an elliptical shape longer in the longitudinal direction.

If the hole diameter of the through hole 10 in the longitudinal direction of the spokes 4, 4 is set smaller than a half of the widthwise dimension of the through hole 10 in the widthwise direction of the spokes 4, 4, the through hole 10 will hardly be able to facilitate bending deformation of its spoke 4 when an impact load is applied to the vicinity of the joining point of the rim 3 and the spoke 4.

Moreover, if the hole diameter of the through hole 10 in the longitudinal direction of the spokes 4, 4 is set larger than 1.5 times the widthwise dimension of the through hole 10 in the widthwise direction of the spokes 4, 4, the through hole 10 will increase torsional deformation of its spoke 4 when an impact load is applied to the lower end portion of the rim 3. In addition, the spoke 4 will be easily bent when bending stress is applied to the spoke 4. Thus, it will be difficult to absorb an impact load that tries to bend the spoke 4.

In a case of determining the shape of the hole 9 based on the bending rigidity and torsional rigidity of the portion of the spoke 4 where the hole 9 is formed, the bending rigidity is set to such bending rigidity that the amount of bending deformation at the portion where the hole 9 is formed will be increased when a load that bends the spoke 4 is applied to the rim 3. Moreover, the torsional rigidity is set to such torsional rigidity that the amount of torsional deformation at the portion where the hole 9 is formed will not be increased when a load that twists the spoke 4 is applied to the rim 3.

With the position and shape of the hole 9 satisfying the above-described conditions, even when, for example, an impact load is applied to the lower end portion of the rim 3, resulting in torsional deformation of the spokes 4, 4, their holes 9 do not increase the amounts of the torsional deformation. Moreover, when, for example, an impact load is applied to one of the joining points of the spokes 4, 4 and the rim 3, resulting in bending deformation at the spoke 4, the amount of the bending deformation of the spoke 4 is increased by the influence of the corresponding hole 9

With the configuration as described above, an impact load can be sufficiently absorbed at the spokes 4, 4.

Figure 3:
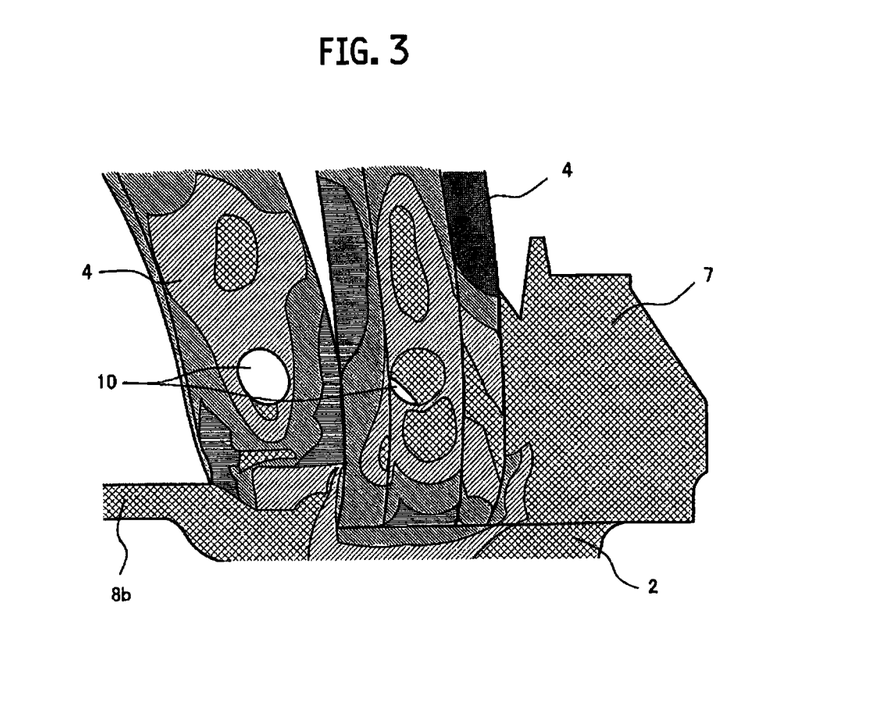
FIG. 3 is an explanatory view showing the state of stress in the wheel body at the moment of the application of the impact load to the lower end portion of the rim of the steering wheel according to the embodiment (a view showing an analysis result).
Figure 4:
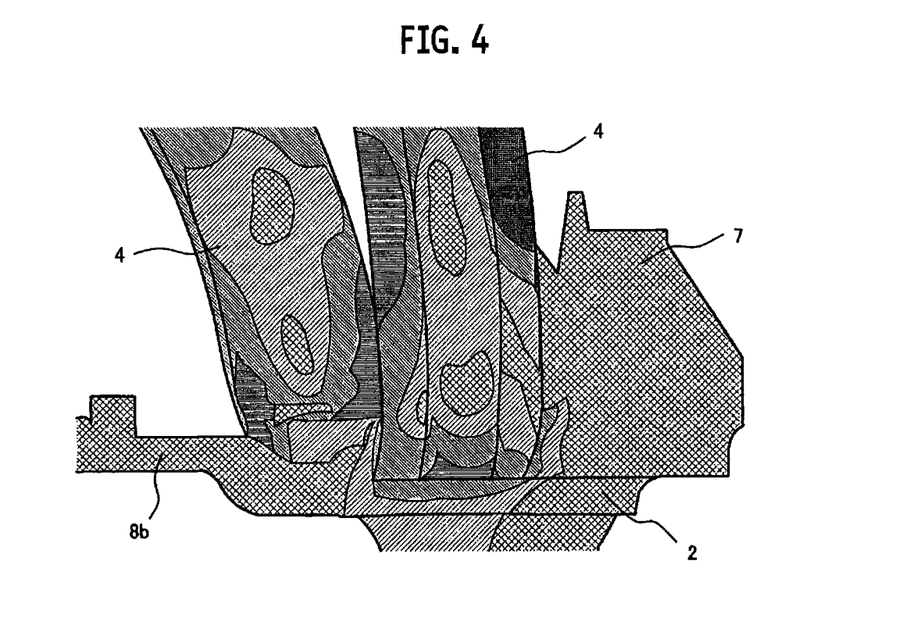
FIG. 4 is an explanatory view showing the state of stress in a wheel body in which the through hole is not formed, at the moment of application of the impact load to a lower end portion of a rim of a related steering wheel (a view showing an analysis result).

Next, a case where an impact load F is applied to the lower side of the rim 3 will be described with reference to FIGS. 2 to 4. FIG. 3 shows the result of an analysis on a stress distribution in each spoke 4 in which the through hole 10 is formed. FIG. 4 shows the result of an analysis on a stress distribution in each spoke 4 in which the through hole 10 is not formed.

Note that the analysis results in FIGS. 3 and 4, as well as analysis results in FIGS. 7 and 8 to be described later, differ from each other only in that one involves formation of the through hole 10 in the spoke 4 while the other does not involve the formation of the through hole 10, and the other features of the configuration remain the same. Moreover, FIGS. 3 and 7 each show an analysis result in the case where the through hole 10 is formed on the bending portion 11b side. A similar result to the result to be described below can be obtained also in the case where the through hole 10 is formed on the bending portion 11a side.

Note that in the stress distributions in FIGS. 3, 4, 7, and 8, each dark area represents a high-stress distribution state, and the other areas with lower stress in the distribution are illustrated with diagonal lines extending downward to the right, with horizontal lines, with diagonal lines extending downward to the left, and with lines crossing in the right-left direction which represent degrees of stress in descending order.

FIG. 3 shows the result of an analysis on a stress distribution in each spoke 4 in which the through hole 10 is formed, obtained upon application of the impact load F to the lower side of the rim 3 as shown in FIG. 2. FIG. 4 shows the result of an analysis on a stress distribution in each spoke 4 in which the through hole 10 is not formed, obtained from the same situation.

When an impact load is applied to the lower side of the rim 3, the metal core 3a of the rim 3 is displaced as shown in FIG. 2 from a state illustrated by solid lines to a state illustrated by dotted lines. Here, the stress is distributed in the spoke 4 such that substantially the same stress distribution state is obtained regardless of whether the through hole 10 according to this embodiment is formed in the spoke 4 as shown in FIG. 3 or the through hole 10 is not formed in the spoke 4 as shown in FIG. 4. In addition, the stress distribution shown in FIG. 3 also indicates a torsionally-resistant stress distribution state.

As described above, even when the through hole 10 according this embodiment is formed in the spoke 4, the spoke 4 can handle application of an impact load to the lower side of the rim 3 to a satisfactory extent and exhibit the function required for the spoke 4 to a satisfactory extent.

Figure 5:
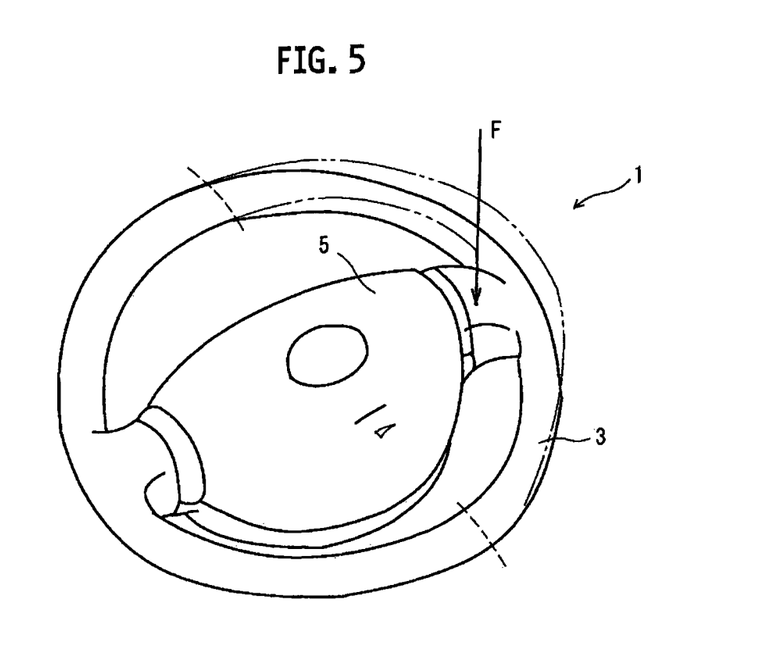
FIG. 5 is an explanatory view showing application of an impact load to one of joining points of the rim and spokes of the steering wheel according to the embodiment.
Figure 6:
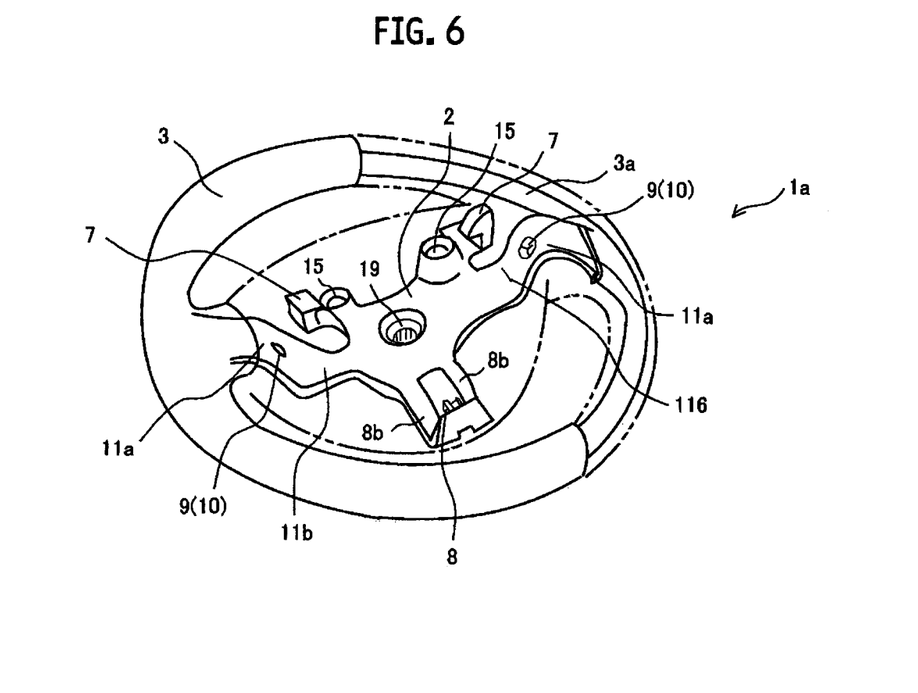
FIG. 6 is an explanatory view showing the state of the wheel body at the moment of the application of the impact load to the one of the joining points of the rim and the spokes of the steering wheel according to the embodiment.

Next, a case where an impact load is applied to the vicinity of one of the joining points of the rim 3 and the spokes 4 will be described with reference to FIGS. 5 to 8. When an impact load F is applied as shown in FIG. 5, the rim 3 is deformed from a state illustrated by solid lines to a state illustrated by two-dot chain lines. Here, as shown in FIG. 6, in the wheel body 1a, the corresponding spoke 4 undergoes bending deformation at the rim 3 side of the spoke 4 about the bending portions 11a, 11b.

Figure 7:
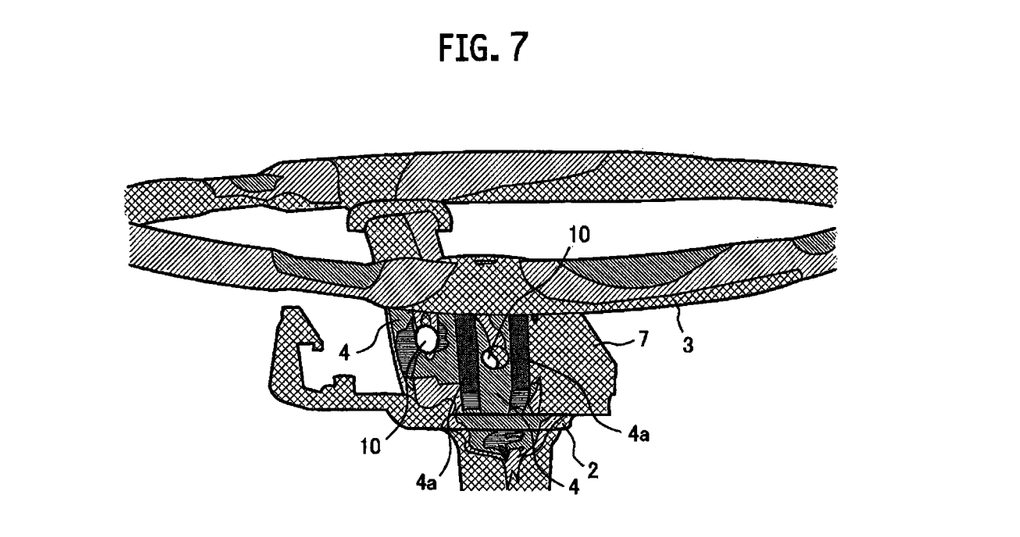
FIG. 7 is an explanatory view showing the state of stress in the wheel body at the moment of the application of the impact load to the one of the joining points of the rim and the spokes of the steering wheel according to the embodiment (a view showing an analysis result).
Figure 8:
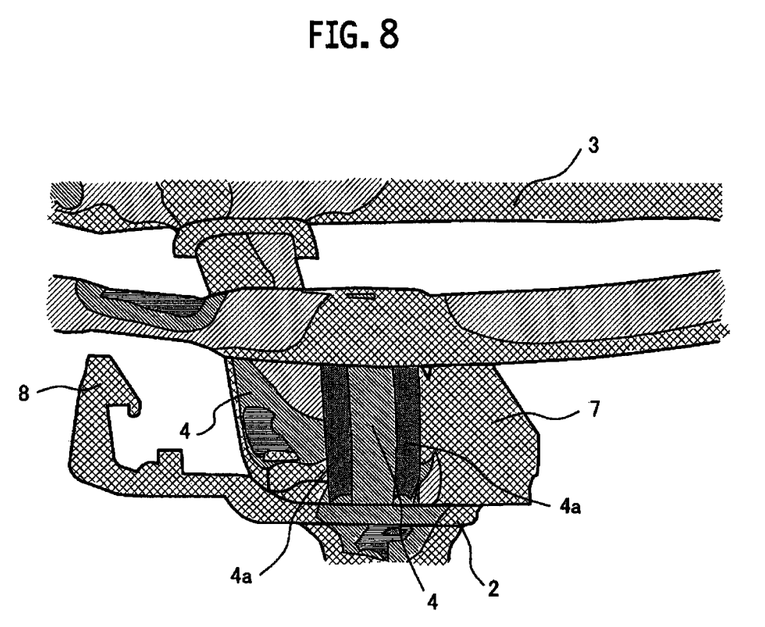
FIG. 8 is an explanatory view showing the state of stress in the wheel body in which the through hole is not formed, at the moment of application of the impact load to one of joining points of the rim and spokes of the related steering wheel (a view showing an analysis result).

FIGS. 7 and 8 shows the results of analyses on stress distributions in the spoke 4 obtained upon application of the impact load F as shown in FIG. 5. FIG. 7 shows an analysis result in the case where the through hole 10 is formed in the spoke 4. FIG. 8 shows an analysis result in the case where the through hole 10 is not formed in the spoke 4.

As for the stress at the inner side of the spoke 4, a comparison of FIGS. 7 and 8 shows that the spoke 4 in which the through hole 10 is formed has higher stress in the periphery of where the through hole 10 is formed, than does the spoke 4 in which the through hole 10 is not formed. This indicates that bending deformation at the spoke 4 occurs more easily in the case where the through hole 10 is formed than in the case where the through hole 10 is not formed. In addition, as for the stress distribution in the reinforcing ribs 4*a* of the spoke 4, the stress distribution state in the case where the through hole 10 is formed is equivalent to that in the case where the through hole 10 is not formed.

As described above, even when the through hole 10 according to this embodiment is formed, the torsional deformation at its spoke 4 is not greatly influenced, and behavior similar to that in the case where the through hole 10 is not formed can be exhibited. In addition, as for the bending deformation of the spoke 4, the spoke 4 can be bent more easily when the through hole 10 according to this embodiment is formed than when the through hole 10 is not formed. Here, although the spoke 4 has the easily bendable configuration, a necessary displacement stroke can still be given to the rim. Thus, bending deformation which can sufficiently absorb an impact load at the spoke 4 can be realized.

Although the embodiments of the present invention have been described above, the invention is not limited to the above embodiment, and various modifications are possible.

The invention claimed is:

1. A steering wheel, comprising:
   a boss joined to a steering shaft;
   a rim arranged at an outer circumferential position of the boss;
   a first spoke connecting a first point of the boss and a first joining point of the rim, and having two bending portions in a longitudinal direction of the first spoke; and
   a second spoke connecting a second point of the boss different from the first point of the boss and a second joining point of the rim opposite to the first joining point of the rim to the boss, and having two bending portions in a longitudinal direction of the second spoke, wherein
   the first spoke has a circular first hole in a portion of the first spoke located at a middle in the longitudinal direction of the first spoke and at a center in a widthwise direction of the first spoke between the two bending portions of the first spoke,
   the second spoke has a circular second hole in a portion of the second spoke located at a middle in the longitudinal direction of the second spoke and at a center in a widthwise direction of the second spoke between the two bending portions of the second spoke,
   the first hole is a first through hole penetrating the first spoke in a direction perpendicular to the widthwise direction of the first spoke,
   the second hole is a second through hole penetrating the second spoke in a direction perpendicular to the widthwise direction of the second spoke,
   a first hole diameter of the first through hole in the longitudinal direction of the first spoke is within a range of 0.5 to 1.5 times a second hole diameter of the first through hole in the widthwise direction of the first spoke, and
   a third hole diameter of the second through hole in the longitudinal direction of the second spoke is within a range of 0.5 to 1.5 times a fourth hole diameter of the second through hole in the widthwise direction of the second spoke.

2. The steering wheel according to claim 1, wherein a cross-sectional shape of the first through hole and a cross-sectional shape of the second through hole are circular respectively.

* * * * *